(12) United States Patent
May et al.

(10) Patent No.: US 7,610,479 B2
(45) Date of Patent: Oct. 27, 2009

(54) COMPUTING DEVICE METHOD THAT PRESENTS AS A SINGLE FILE SYSTEM OPERATING SYSTEM COMPONENTS IN BOTH EXECUTABLE AND NON-EXECUTABLE MEMORY

(75) Inventors: Dennis May, London (GB); Andrew Jordan, Dartmouth (GB); Mark Dowman, Montauroux (FR)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/566,142

(22) PCT Filed: Jul. 28, 2004

(86) PCT No.: PCT/GB2004/003268

§ 371 (c)(1),
(2), (4) Date: Nov. 1, 2006

(87) PCT Pub. No.: WO2005/013125

PCT Pub. Date: Feb. 10, 2005

(65) Prior Publication Data

US 2007/0043938 A1    Feb. 22, 2007

(30) Foreign Application Priority Data

Aug. 1, 2003    (GB) ................................ 0318037.9

(51) Int. Cl.
*G06F 9/00* (2006.01)
(52) U.S. Cl. .......................................... 713/2; 707/200
(58) Field of Classification Search ..................... 713/2; 707/200
See application file for complete search history.

(56) References Cited

U.S. PATENT DOCUMENTS

| | | | |
|---|---|---|---|
| 6,154,838 A | 11/2000 | Le et al. | |
| 6,988,163 B2 * | 1/2006 | Malueg et al. | 711/103 |
| 7,120,730 B2 * | 10/2006 | Maleug et al. | 711/103 |
| 2003/0050087 A1 | 3/2003 | Kwon | |
| 2006/0190939 A1 * | 8/2006 | Chen et al. | 717/168 |

FOREIGN PATENT DOCUMENTS

| | | |
|---|---|---|
| EP | 1286263 | 2/2003 |
| GB | 2385167 | 8/2003 |
| GB | 2338574 | 12/2003 |
| WO | 0277824 | 3/2002 |

OTHER PUBLICATIONS

M. Tim Jones, "Anatomy of Linux flash file systems," IBM developerWorks, May 20, 2008.*

* cited by examiner

*Primary Examiner*—Thomas Lee
*Assistant Examiner*—Albert Wang
(74) *Attorney, Agent, or Firm*—Saul Ewing LLP

(57) ABSTRACT

A method of operating a computing device having NAND flash memory for storage of program code and user data. At start up, only selected components of the computing device core operating system are shadowed into RAM. Other components, such as read only system files associated with the core operating system, are retained in the NAND flash memory and only shadowed into RAM upon demand. The program codes shadowed into RAM at start up and the program codes shadowed into RAM upon demand are presented to a file server of the computing device as a composite file system. The use of the composite file system reduces the amount of RAM permanently occupied by core operating system code during operation of the device and also enhances the use of the more power efficient NAND flash memory. Moreover, the boot up time of the device is also significantly reduced.

22 Claims, 3 Drawing Sheets

COMPUTING DEVICE METHOD THAT PRESENTS AS A SINGLE FILE SYSTEM OPERATING SYSTEM COMPONENTS IN BOTH EXECUTABLE AND NON-EXECUTABLE MEMORY

CROSS REFERENCE TO RELATED APPLICATIONS

This application claims the priority of GB 0318037.9 filed Aug. 1, 2003 and PCT/GB2004/003268, filed on Jul. 28, 2004.

BACKGROUND OF THE INVENTION

Field of the Invention

The present invention relates to a method of accessing data in a computing device and, in particular to a method of accessing data in a computing device incorporating non-executable memory, such as NAND flash memory. The present invention also relates to a computing device controlled by the method.

The term computing device as used herein is to be expansively construed to cover any form of electrical device and includes, data recording devices, such as digital still and movie cameras of any form factor, computers of any type or form, including hand held and personal computers, and communication devices of any form factor, including mobile phones, smart phones, communicators which combine communications, image recording and/or playback, and computing functionality within a single device, and other forms of wireless and wired information devices.

Computing device memory may be classified by its ability to execute program code. Certain types of memory, such as random access memory (RAM) and read only memory (ROM), provide full visibility of the memory address locations (the memory cells in the memory space within the device) to an addressing unit, such as a central processing unit or file server of a computing device or an application program running on the device, requiring to execute or use the program code or data stored in the memory. Hence, these types of memory have 'random access ability'. These types of memory can therefore be used as executable memories. This means that, for example, program code stored in the memory can be executed directly from the memory. This type of program code execution is generally known as execution in place (XIP).

However, there are other forms of memory which do not exhibit the above characteristics and therefore cannot function directly as executable memory. These are known as non-executable memories. One example of a non-executable memory is NAND flash memory which, principally, was developed for data storage applications and not for data access, such as program code execution. This enabled a different type of internal architecture to be adopted for the memory space, which provides a small cell size. This architecture permits fast burst access to stored data but does not permit a direct access (random access) to all memory cells, and thus data stored within the memory space. This architecture provides a more complex interface within the memory space to the memory cells but only requires a simplified input/output interface for memory access, in comparison to those required in executable memories, such as NOR flash memory. Hence, NAND flash memory provides a lower cost per code bit to be stored, smaller size, and consumes relatively less power than equivalent size executable memory, such as NOR flash memory.

A NAND flash memory device is organised as a number of blocks and a 128 Mb array will typically comprise of 1024 blocks. A block can be regarded as the smallest unit within the memory space that can be erased at any time. Each block consists of a number of pages (typically 32 pages) and a page can be regarded as the base unit for programming or storing data into or reading data from the memory. Each page will typically comprise 512 bytes of data. Because of the fabrication processes used to manufacture the devices, they can contain both good and bad blocks, which will be apparent from the description below.

NAND flash memory is becoming increasingly popular for use in computing and other electronic devices, and in particular for use in mobile phones and other portable devices, because of the relatively low cost, and most advantageously for portable devices which are powered by a battery source, their relatively low power consumption. However, a drawback of NAND Flash memory is that access to stored data is relatively sequential rather than being totally random because each time a read or write command is issued, the amount of data transferred is always one page, which consists of 512 bytes. There is no ability to randomly access a few selected bytes within a page which means that NAND flash memory cannot be used directly for executing applications programs on portable computing devices, because these are required to be used as XIP programs.

One method for overcoming this drawback is for the bootloader program on the computing device, which includes the core operating system (Core OS) code necessary for the device to start up at switch on, to copy or shadow all of the Core OS program code stored in the non-executable NAND flash memory into executable dynamic RAM before any program code is executed.

It is emphasised that in the example of the present invention described below selected program code is copied or shadowed into dynamic RAM before code execution, with retention of the original code in the NAND flash memory. This is the preferred method for mobile computing devices, and particularly for those mobile computing devices where the selected program code is Core OS, because if for any reason there is a loss of power to the device, which would cause the code stored in the dynamic RAM to be lost, the selected code would continue to be available for shadowing again from the NAND flash memory.

However, there can be applications where the loss of code from the dynamic RAM is not considered critical, and in these circumstances, the code in the NAND flash memory may be shadowed or copied into dynamic RAM without original code retention in the NAND flash memory. Hence, for the avoidance of doubt, in the context of the present invention, the word 'copied' is intended to cover when the selected code is shadowed into executable memory both with and without retention of the selected original code also in the non-executable memory.

If the entire program code content in the NAND flash memory, which typically will comprise not only the Core OS but also additional program files used during operation of the device and thus may include a very large amount of code, is shadowed to dynamic RAM, this becomes burdensome in terms of the time required to boot up the computing device. Furthermore, the shadowed code will also permanently occupy a significant proportion of the device dynamic memory for the duration of device operation. In a portable device such as a wireless communications device, this dynamic memory is regarded as a limited and valuable resource: such a device will typically include only 8 or 16 MB of dynamic RAM. If on the other hand only part of the NAND flash program code is copied, much complexity is usually introduced because applications requiring to use the program code need to be aware of which components of the code have been copied to dynamic RAM and are available, and which components have not been copied to dynamic RAM and therefore are not available.

Additionally, when the data stored in the NAND flash memory is the Core OS, the number of program components contained in the memory may vary from one device system operating platform to another, and also from one device to another within the same platform. This is particularly the case when the Core OS has several different users, such as can typically occur with wireless communications devices where various manufacturers and device suppliers adopt certain components of the Core OS as common components, but tailor other components of the Core OS to their respective device requirements by choosing different trade-offs between the speed improvement in having one or more system components permanently shadowed in dynamic RAM, versus the amount of valuable RAM memory this consumes.

BRIEF SUMMARY OF THE INVENTION

It is an object of the present invention to provide an improved method for operating a computing device such that the lower cost and power consumption benefits of non-executable memory can be more fully realised; and also to provide a faster boot time for the device.

According to a first aspect of the present invention there is provided a method of accessing data from non-executable memory of a computing device, the method comprising providing a composite data file system comprising selected data copied from the non-executable memory and stored in executable memory, in combination with further data remaining in the non-executable memory, and accessing the data in the composite data file system by accessing the selected data from the executable memory and accessing the further data by selectively copying the further data to the executable memory.

According to a second aspect of the present invention there is provided a computing device arranged to operate according to the method of the first aspect.

According to a third aspect of the present invention there is provided computer software arranged to cause a computing device to operate in accordance with the first aspect.

DETAILED DESCRIPTION OF THE INVENTION

One example of an operating system for a computing device in the form of a wireless information device is that available from Symbian Limited of London, England and known as Symbian OS™. The present invention will be described with reference to partitioning and access of NAND flash memory in a wireless information device using Symbian OS™, when used to store both operating system program code and user data, and also in relation to the format of both the system code image(s) and user data area(s).

Figure 1:
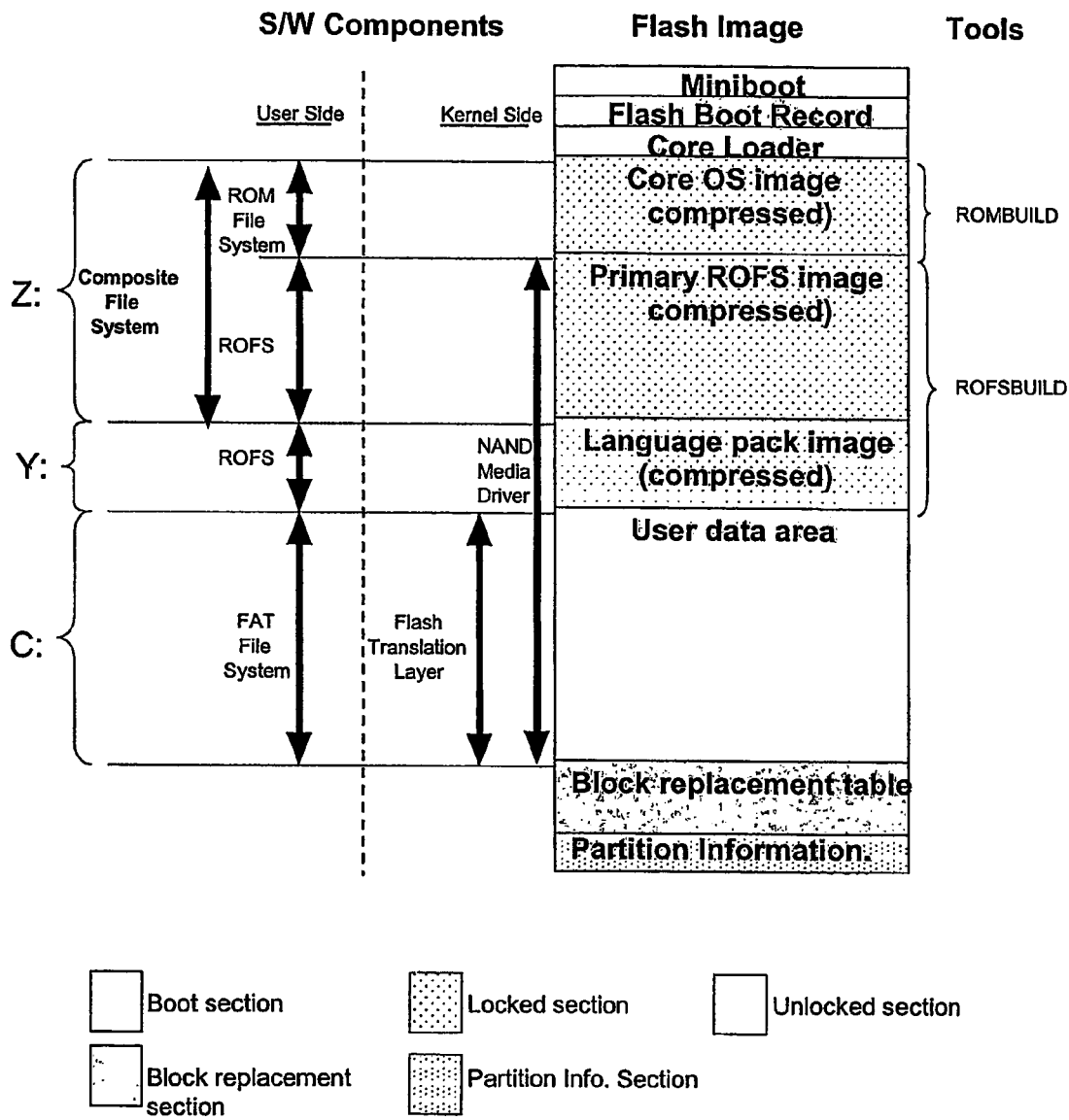
FIG. 1 is a diagram showing how computing device memory resources are accessed in accordance with an embodiment of the present invention.
Figure 2:
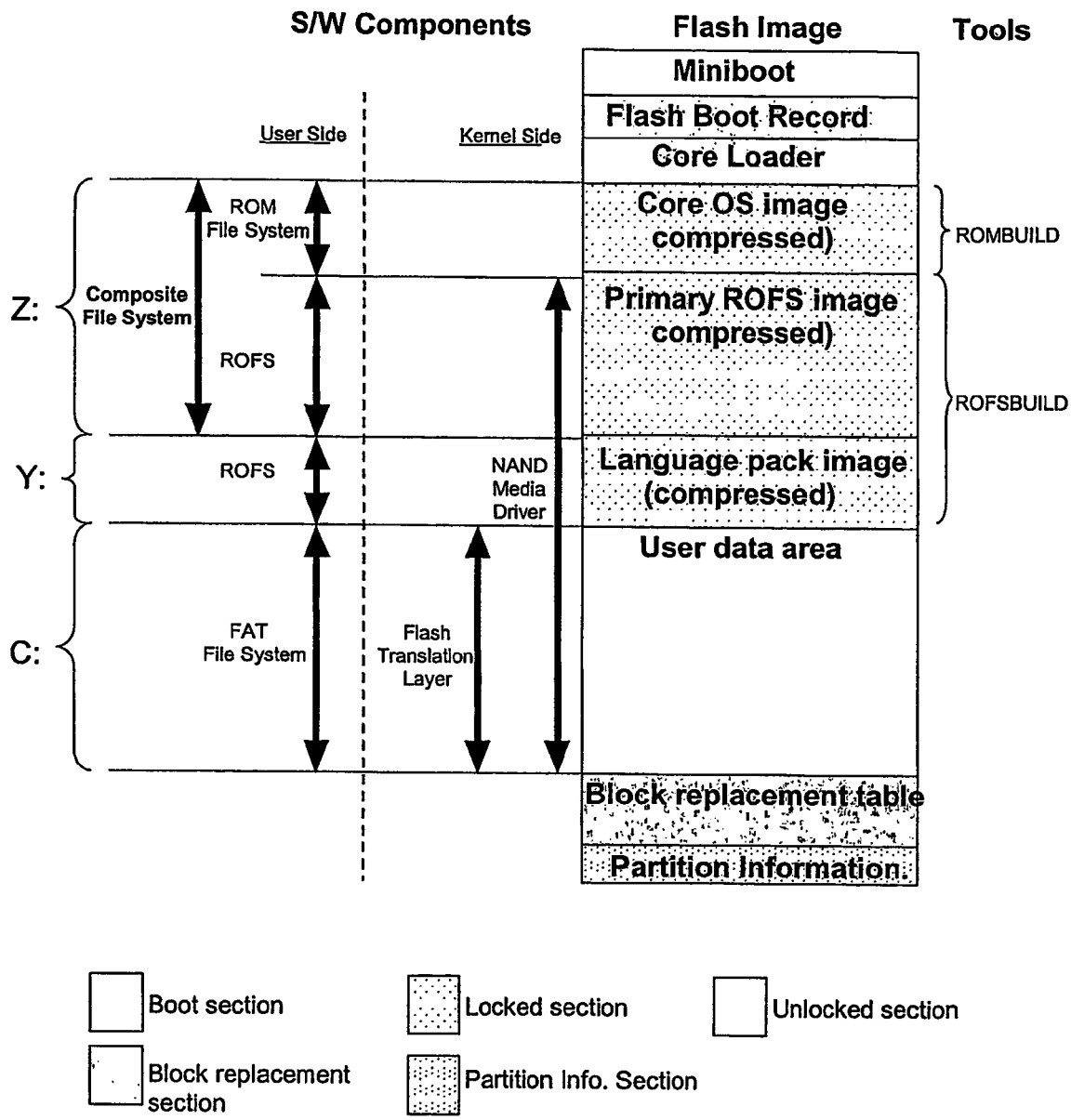
FIG. 2 is a diagram showing how the computing device memory resources can be partitioned in accordance with an alternative embodiment of the present invention.

FIGS. 1 and 2 show how operating system program code, user data and meta-data areas can be partitioned within the NAND flash memory. On the left hand side of each figure, the software components in Symbian OS™ which interface with each of the above areas in the NAND flash memory are shown. On the right hand side of each figure, the tools or software components which are responsible for generating the different code, data and meta-data images are shown.

It can be seen from the figures that, for a NAND flash memory which is used in this manner for both code and data storage, the memory is partitioned into sections. A critical part of the overall operating system for the computing device is what is generally known as the Core Operating System (Core OS). The Core OS is arranged to include only those parts of the overall operating system that are necessary to enable the device to boot up and operate when it is switched on. For reasons which will become apparent from the description below, the Core OS is stored in the NAND flash memory as a single image. Because the NAND flash memory is used to store this Core OS image, and also to store other operating system images which also must not be modified by a user, at least one of the memory sections is locked. The memory is, therefore, preferably divided into the following five sections Boot Section
Locked Section
Unlocked Section
Block replacement Section
Partition Information Section These five sections will now be described in greater detail.

Boot Section

This section occupies the first block of the NAND flash memory and is only one memory block in length. NAND flash memory manufacturers guarantee that the first block is always good and so there is no requirement for the code image stored in the boot section to handle the case where this block is bad. In the embodiment shown in FIG. 1, the boot section contains a MiniBoot image and a Core Loader image.

MiniBoot

Since NAND flash memory is non-executable memory (non-XIP), any wireless information device using NAND flash memory for program code storage should be provided with a hardware mechanism for enabling the device to boot from the NAND flash memory at boot up and subsequently load the Core OS image. Options which may be adopted include a hardware boot loader—logic associated with the NAND flash memory, including a small RAM buffer which has the effect of 'effectively' converting a small part of the NAND flash memory to XIP at start up. Alternatively, a small boot ROM—a separate XIP ROM that contains program code to shadow the first part of the code data store in the NAND flash memory into RAM, may also be used. These options may be used either alone or in combination.

With any of the above options, a mechanism is provided which enables a small area of XIP memory (which typically can be less than 1K bytes capacity) at start up of the device to execute a boot-up program. This program is referred to as the MiniBoot and is normally written in assembler code. The function of this program is to locate the Core Loader image, copy this image into RAM and then execute it.

Hence, the first part of the NAND flash memory contains the MiniBoot image and this would not normally contain any sort of standard header information. Preferably, the MiniBoot image contains only a small portion of executable code. In the embodiment of FIG. 1, the Miniboot image obtains the location and length of the Core Loader image from an extension of a data table held in a Partition Information Block (PIB) within the NAND flash memory. The PIB is described in greater detail below.

Core Loader

The function of the Core Loader image is to locate the Core OS image, copy this image into RAM and execute the operating system bootstrap routine contained within it. The Core Loader image itself is copied and stored into RAM by the MiniBoot image.

The Core OS image is stored in the Locked Section within the NAND flash memory. This section of the memory may contain bad blocks.

Therefore the Core Loader image is also arranged to interpret a Block Replacement Table (BRT) for this Locked Section because it may be required to read certain blocks of the Core OS data from the Block Replacement Section in the event that a bad block is found to be present in the Locked Section.

The Core OS image is preferably stored in a compressed format. Therefore, the Core Loader image has to detect this fact and de-compress the Core OS image code as necessary. This is described below in more detail with reference to the Locked Section. The Core Loader image normally starts immediately after the MiniBoot image and preferably does not extend beyond the first block in the memory. This ensures that the MiniBoot image never needs to perform bad block detection, and therefore helps to minimise the size of the MiniBoot image. The Core Loader image is also normally written in assembler code and would not normally contain any standard header.

Locked Section

This section contains the entire code image, apart from the MiniBoot and Core Loader images, required to operate the device. This code image consists of the Core OS image, one or more Read Only File System (ROFS) images, and one or more Language Pack images, and its overall size depends on the size of the code required to represent these images. Any part of the locked section of the NAND flash memory may contain bad blocks.

Core OS Image

Because the NAND flash memory is non-executable memory and cannot function as XIP, this image is automatically shadowed into executable memory, typically RAM, at system start up. This is achieved by the Core Loader image. The start of the Core OS image may be located directly after the end of the Core Loader image, and therefore within the first block of the NAND flash memory. Alternatively, this image may be arranged to start at the beginning of the second good block on the NAND flash memory. In the embodiment shown in FIG. 1, the Core Loader image locates the Core OS image by reading its location from the extension to the table held in the Partition Information Block.

A ROMBUILD software tool is initially used to generate the Core OS image stored in the NAND flash memory and, in essence, this image is formatted as a standard ROM image. This image may typically comprise a ROM header, a bootstrap binary image, a root directory list which lists all the root directories, one for each variant supported by this ROM image, a directory structure of the ROM image, and a number of files which make up the executables and data that constitute the ROM image. As stated above, the Core OS image is usually restricted to those operating system components considered necessary to operate the wireless information device.

However, the Core OS image is usually stored in the NAND flash memory in a compressed format to save memory space. The components of the Core OS image are usually used as a group and are not required to be used individually. Hence, rather than each component of this image being compressed component by component, the entire Core OS image is usually compressed as a single image, starting after the ROM header: the ROM header itself is not usually compressed. Compression of this image is performed by the ROMBUILD software tool as it is stored into the NAND flash memory and the ROM header includes fields indicating the compression type, the compressed size and the uncompressed size of the Core OS image.

This image is decompressed by the Core Loader image as it is shadowed into RAM. Because all of the components of the Core OS image are compressed as a whole; i.e. as a single image, decompression can also be carried out on the basis of a single image, and not serially component by component. Hence, decompression of this image can be achieved efficiently and relatively quickly, providing fast downloading of the components within this image into the executable RAM memory for access as XIP. Therefore, it can be appreciated that the Core OS image is particularly suited for relatively fast shadowing from the non-executable NAND flash memory to executable dynamic RAM for XIP.

Primary Read Only File System (ROFS)

Most operating system code that is not included in the Core OS image is usually located in a primary ROFS image, which consists of a number of components. The file server of the device uses a Read-Only File System (ROFS) to access this image. The ROFS image uses a media driver to read the code from the NAND Flash memory and load this into RAM for access or execution. This can be achieved by the media driver locating the primary ROFS image by reading its location from the Partition Information Block.

The components of the ROFS image each has a format very similar to, but not identical to, a standard ROM image, and is generated by a ROFSBUILD software tool. As with a standard ROM file system image, the ROFS image contains executable programs and dynamic link libraries (DLLs) for use within the core operating system. In common with the Core OS image, the ROFS image components are usually compressed by the ROFSBUILD tool as they are stored in the NAND flash memory. However, the components of the ROFS image are rarely used as a whole; for example many of the DLLs may be used as discrete libraries of program code that can be used by one or more executable programs, such that when an executable program is loaded by a file server, the specific DLLs required by that program are also automatically loaded but the DLLs not required by that program are not loaded. Hence, all of the individual components of the ROFS image are not compressed as a single image as they are stored into NAND flash memory, but are compressed component by component. Any suitable compression type and technique may be used to compress the ROFS image components.

When the components of the ROFS image are required to be executed in the device, they must be decompressed and stored in the executable dynamic RAM. However, because the ROFS image has been compressed component by component, it must also be decompressed component by component as it is shadowed into RAM. For an equivalent size image, decompression component by component takes significantly longer than to decompress the image as a whole. Therefore, in relative terms, to decompress and shadow all of the components of the ROFS image into RAM takes considerably longer than to decompress and shadow the Core OS image into RAM. Hence, if the entire ROFS image is also automatically shadowed into RAM at device boot up, this gives rise to a relatively long delay before the device is ready for operation, and this delay is very noticeable to a user of the device.

Therefore, with the present invention, unlike the Core OS image, which is all permanently shadowed into RAM upon boot up of the device, components in the ROFS image area stored in the NAND flash memory are shadowed into RAM only upon demand. By shadowing only selected parts of the operating system into RAM, for example the Core OS image together with a selected number of components from the ROFS image, and presenting these as a composite file system, these composite file system images are available for more immediate execution in comparison to when the entire ROFS image is shadowed into RAM with the Core OS image at boot up.

As described above, the number of components contained in the Core OS image may vary from one device platform to another, because there is a trade-off between the speed improvement in having an image component permanently shadowed versus the amount of RAM this consumes. However, the Core OS image must always contain the minimum set of components required to start up the ROFS. These components are known as the media area of the core operating system. For Symbian OS™ this minimum set will typically include the following components:—

Bootstrap.

Kernel, Kernel Extensions and Media Drivers.

User Library.

File Server, File Systems (.FSYs) and ESTART (a file which loads services assumed by an application already to exist).

Once these components have been loaded into RAM they have the appearance of a standard ROM image and the File Server of the device internally uses its standard ROM File System for access.

However, with the present invention, this core operating system media area, which in the Symbian OS™ is in the form of a standard ROM file system, is combined with a media area of the Primary ROFS, and this combination is presented as a single composite read only file system. In this way, these two media areas, one of which is held in executable RAM and the other of which is held in non-executable NAND flash memory, are presented to a file server of the device, and therefore to the rest of the system, as a single read-only drive, designated as drive Z: in the accompanying drawings.

Hence, less time is taken to load the critical components of the core operating system into RAM, and less RAM, which is a relatively scarce resource in a small hand held wireless communications device, is permanently occupied during device operation, enabling a larger proportion of RAM to be selectively used for other applications. Certain executables and library files in the ROFS image may, preferably, also be shadowed entirely into RAM with the Core OS image. However, for file read operations from data files in the ROFS image, e.g. reading bit-map files, only the portion being read is loaded by the file system into RAM.

This composite file system also provides very efficient use of the RAM because the system ensures that only essential components of the operating system are shadowed into RAM upon device boot up and those components of the ROFS image, which are accessed periodically during device operation, are only shadowed into RAM upon demand. But, because these permanently shadowed and shadowed on demand components are presented as a single composite file system, it is transparent during operation of the device that certain operating system components are being read directly from RAM (the Core OS image) and that other less frequently used components (components of the ROFS image) are being read from the NAND flash memory via shadowing into RAM upon demand It is also possible to section the Core OS image with an extension ROM image following the main image. This allows the main part of the Core OS image to be programmed into the NAND flash memory independently from the extension image. This can be of advantage when, for example, a wireless information device manufacturer adopts certain components of the core operating system, but wishes to combine these components with other components specific to that manufacturer to provide a Core OS image for the wireless information device. This specific Core OS image, in essence comprising of the main image and the extension image, are then shadowed in combination into RAM upon device boot up. In such a case, the extension ROM image can be compressed separately from the main image, with the header of the extension ROM image (TExtensionRomHeader) not being compressed and containing the same three fields regarding compression information, as outlined above. With this embodiment, the Core Loader image would also be modified to handle the de-compression and loading of the extension ROM image.

Language Packs

Where there is a requirement to program localisation files independently from the rest of the core operating system, a second ROFS image may be used. This image may be arranged as a ROFS extension image following the main ROFS image. However, unlike a ROM extension which is permanently shadowed into RAM, the ROFS extension image is shadowed into RAM upon demand. In the embodiment shown in FIG. 1 this ROFS extension image is presented as part of the composite file system, i.e. the Z: drive. Extension ROM images are not envisaged to be used for holding localisation since any data in the extension ROM would have to be permanently shadowed in RAM.

However, in the embodiment shown in FIG. 2, the ROFS extension image does not form part of the composite file system but is instead presented as a separate drive Y:. Again, for this drive Y, ROFS uses a media driver to read the data from the NAND flash memory. The same media driver can be used both for this drive and the ROFS image of the composite drive Z:. In the embodiment of figure, the media driver again locates the Language Pack ROFS area by reading its location from the Partition Information Block.

Unlocked Section

This section contains the whole of the user data area and may contain more than one user data partition. In the embodiment of FIG. 1, the information for each partition is also preferably stored within the Partition Information Block rather than implementing a Master Boot Record at the start of the unlocked section. Any part of the unlocked section may contain bad blocks.

Each user area partition may be formatted as a normal virtual file allocation table (VFAT) drive with the File Server using its standard VFAT file system to manage these partitions. Flash Translation Layer (FTL) software together with bad block management software (GBBM) can be implemented in a media driver. This can be the same media driver and GBBM software that is used by ROFS. However, since ROFS is read-only, ROFS can be arranged to by-pass the FTL software in the media driver, for efficiency.

Block Replacement Section

This section contains a reservoir of spare blocks within the NAND flash memory. These are used by the GBBM software to replace bad blocks within both the locked and unlocked sections of the NAND flash memory. Hence, the block replacement section reservoir is shared between the locked and unlocked sections. Replacement blocks for the unlocked section are allocated starting from the top of the reservoir (lowest address) and replacement blocks for the locked section are allocated starting from the bottom of the reservoir (highest address). Preferably, the two areas of the reservoir are not allowed to meet, which would mean that all spare blocks in the block replacement section would be in use. In this situation any further bad blocks encountered in the unlocked section would cause the capacity of the unlocked area to reduce. There should be no new bad blocks appearing in the locked area because the locked area is a read-only area of the NAND flash memory. Hence, once the number of replacement blocks required for the locked section have been determined, the number of replacement blocks for allocation as replacement blocks for the unlocked section can be maximised. This ensures that the storage capacity of the unlocked section, which is used to store user data, is not unnecessarily reduced by the occurrence of bad blocks.

This section of the NAND flash memory is also used to store Block Replacement Tables (BRTs). These hold the correlation or mapping information between a bad block in the locked/unlocked sections and the block in the reservoir which replaces it. Preferably, the replacement tables for the unlocked area are located at the top of the section (lowest address) and the replacement tables for the locked area are located at the bottom of the section (highest address). Each replacement table occupies an entire block and, preferably, there are two tables allocated to each section. The block replacement tables can be configured in any suitable format.

As mentioned, each BRT occupies an entire block, but can only store 512 bytes of data (equivalent to one page of data) and allows the mapping of up to 127 blocks. Hence, if additional blocks are required to be mapped in either the locked or unlocked sections, a second BRT for each section can be used. The BRTs for the locked and unlocked sections are, preferably, identical in format.

Figure 3:
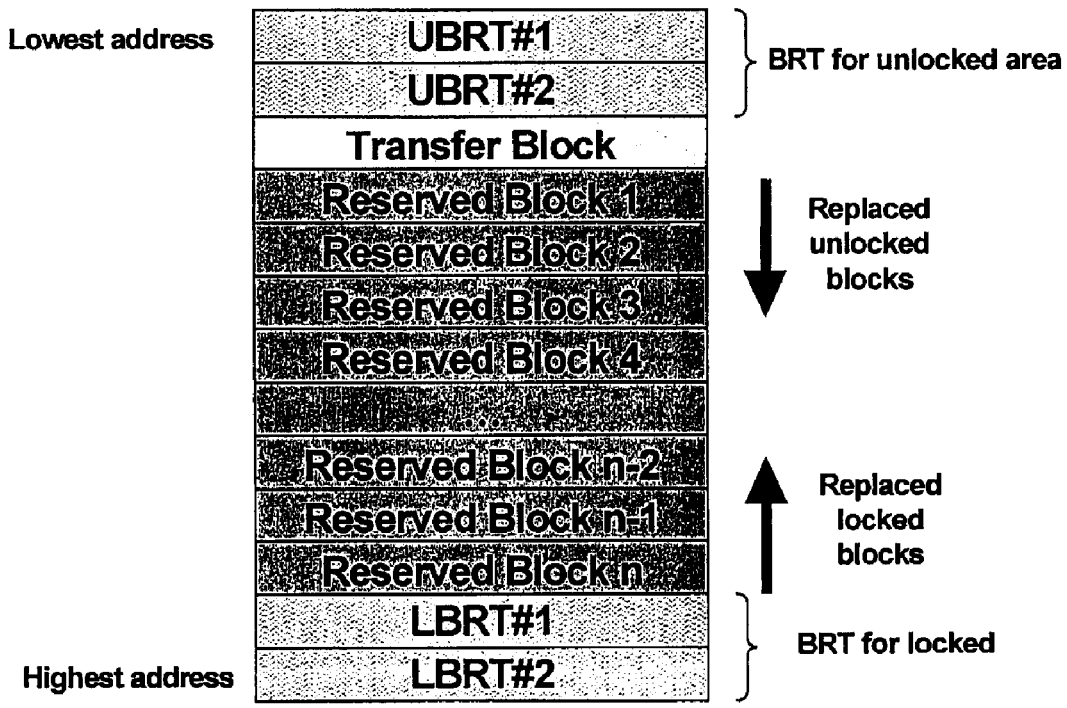
FIG. 3 illustrates the organization of the Block Replacement Section in accordance with the claimed invention.

Additionally, the GBBM software requires a transfer block which is located below the unlocked block replacement tables. Hence, the size of the reservoir is preferably set to be equal to the size of the Block Replacement Section minus five blocks. Therefore, the Block Replacement Section may be organized as illustrated in FIG. 3.

Both BRTs are normally initially programmed into the NAND flash memory during the flashing of the code in the locked area since the flashing program would typically use the GBBM software component. If the GBBM software detects that the Block Replacement Section has not been initialised it will scan the entire flash memory, detect bad blocks and update the appropriate BRT. Information on the location of the Block Replacement Section can also be stored within the Partition Information Block.

Partition Information Block (PIB)

This section contains a number of tables holding information on the location and size of all sections and sub-sections within the NAND flash memory. The PIB is only one block in length and occupies the last good block in the NAND flash memory; i.e. the last block as long as this isn't a bad block. Hence, the location of the PIB may vary. An 8-byte double word in the Boot Section may be used to describe the offset, in bytes, of the start of the PIB. This may be termed as the PIB Offset Double Word. As will be appreciated, the location of the PIB is important for overall device operation because the information held within the block is used to locate the sections of the NAND flash memory. Hence, an 8-byte double word may be used to precede the offset word and this can contain a 64 bit signature, which must first be validated before the PIB Offset Double Word can be read. This assists in protecting against malware tampering with the offset word. The MiniBoot image is preferably arranged to jump around the PIB Offset Double Word and the 64 bit signature.

In the embodiment shown in FIG. 2, the boot section also includes a Flash Boot Record (FBR) image, which holds information on the location and size of each of the other sections and sub-sections on the memory. In essence, the Flash Boot Record image is used as an alternative to some of the information held in the Partition Information Block.

Flash Boot Record (FBR)

The Flash Boot Record (FBR) image is located between the MiniBoot and the Core Loader images within the NAND flash memory. Since the size of the MiniBoot image is variable, any suitable scheme may be used to locate the Flash Boot Record, such as reserving a word, which may be referred to as the FBR offset word, that contains the offset (in bytes) of the Flash Boot Record image at a particular offset in the boot section of the NAND flash memory. For operating efficiency the MiniBoot image will normally be arranged to skip the FBR Offset Word.

The information for each partition of the NAND flash memory, such as the locked and unlocked sections, and the Block Replacement Section, is also stored within the Flash Boot Record image.

In this embodiment the localisation files are also stored independently from the rest of the code data as a second ROFS image. However, this image is not accessed via the composite Z: drive, but is instead presented as a separate drive—Y:, as shown in the FIG. 2.

Again, for this drive, the read only file system of the computing device uses a media driver to read the data from the NAND flash memory. In fact, the same media driver can be used to read the localisation files image of drive Y: and the ROFS image of the composite drive Z:. The media driver again locates the Language Pack ROFS area by reading its location from the Flash Boot Record image.

It can be seen from the above description that the use of a composite file system enables a minimum number of core operating system components to be permanently shadowed from the non-executable NAND flash memory into executable RAM during device operation. Therefore, the amount of RAM permanently occupied by the core operating system components during device operation is also minimised, maximising the use of the more energy efficient NAND flash memory, thereby reducing the overall power consumption of the device. Furthermore, faster boot up of the device is achieved because fewer core operating system components are shadowed from the NAND flash memory into RAM, and the components which are automatically shadowed into RAM comprise, in essence, the single Core OS image, which is decompressed and shadowed as a single ROM image, optionally in combination with a relatively restricted number of components from the ROFS image, which are decompressed and shadowed component by component.

Moreover, because a composite file system is used for these 'permanently shadowed' and 'shadowed on demand' components, the source of the components is operationally transparent within the device when program code is executed, and is therefore also transparent to a user.

Although the present invention has been described with reference to particular embodiments, it will be appreciated that modifications may be effected whilst remaining within the scope of the present invention as defined by the appended claims.

The invention claimed is:

1. A method of operating a computing device, the method comprising:

storing an operating system, comprising a first component and a further component, in a non-executable memory of the computing device;

copying the first component from the non-executable memory of the computing device to executable memory at operating system start-up, so as to permanently shadow the first component in the executable memory during device operation;

presenting, to a file server of the computing device, the first component in executable memory and the further component in non-executable memory as a single file system;

wherein the first component is accessed from the executable memory, where it is shadowed permanently, and the further component is accessed by selectively copying the further component to the executable memory upon demand by the file server, for subsequent use with the permanently shadowed first component by the file server.

2. A method according to claim 1 wherein the first component is decompressed when copied to the executable memory.

3. A method according to claim 1 wherein the first component is decompressed as a whole when copied to the executable memory.

4. A method according to claim 1 wherein the further component comprises compressed data which is decompressed when selectively copied to the executable memory.

5. A method according to claim 1 wherein the further component is decompressed component by component when selectively copied to the executable memory.

6. A method according to claim 1 wherein the first component comprises core operating system data for the computing device.

7. A method according to claim 6 wherein the core operating system data comprises program code for enabling boot-up of the computing device and access to read only file system (ROFS) data for the computing device.

8. A method according to claim 7 wherein the first component further comprises selected components of the ROFS data.

9. A method according to claim 1 wherein the further component comprises ROFS data.

10. A method according to claim 9 wherein the further component comprises an executable program.

11. A method according to claim 9 or 10 wherein the further component comprises a dynamic link library.

12. A method according to claim 1 wherein the first component is in the form of one or more ROM images.

13. A method according to claim 1 wherein the location of at least one of the first and further components within the non-executable memory is determined by reading an address from a section of the non-executable memory.

14. A method according to claim 1 wherein additional data is selectively copied to the executable memory in addition to the first and further components in the composite file system.

15. A method according to claim 14 wherein the additional data is selectively copied to the single file system.

16. A method according to claim 14 or 15 wherein the additional data comprises a language pack image.

17. A method according to claims 14 or 15 wherein a common driver is used to selectively copy the first and further components to the executable memory.

18. A method according to claims 14 or 15 wherein the first and further components, and the additional data, are stored in a section of the non-executable memory locked to a user.

19. A method according to claim 1 wherein the non-executable memory is selected to comprise NAND flash memory.

20. A method according to claim 1 wherein the executable memory is selected to comprise random access memory (RAM).

21. A computing device comprising a non-executable memory, an executable memory, and a file server, and programmed to:

store an operating system, comprising a first component and a further component, in the non-executable memory;

copy the first component from the non-executable memory to the executable memory at operating system start-up, so as to permanently shadow the first component in the executable memory during device operation;

present, to the file server, the first component in the executable memory and the further component in the non-executable memory as a single file system;

wherein the first component is accessed from the executable memory, where it is shadowed permanently, and the further component is accessed by selectively copying the further component to the executable memory upon demand by the file server, for subsequent use with the permanently shadowed first component by the file server.

22. Computer software arranged to cause a computing device, comprising a non-executable memory, an executable memory, and a file server, to:

store an operating system, comprising a first component and a further component, in the non-executable memory;

copy the first component from the non-executable memory to the executable memory at operating system start-up, so as to permanently shadow the first component in the executable memory during device operation;

present, to the file server, the first component in the executable memory and the further component in the non-executable memory as a single file system;

wherein the first component is accessed from the executable memory, where it is shadowed permanently, and the further component is accessed by selectively copying the further component to the executable memory upon demand by the file server, for subsequent use with the permanently shadowed first component by the file server.

* * * * *